United States Patent
Matsumura et al.

(10) Patent No.: US 11,628,768 B2
(45) Date of Patent: Apr. 18, 2023

(54) DRIVING SUPPORT DEVICE FOR VEHICLE, DRIVING SUPPORT METHOD FOR VEHICLE, AND NON-TRANSITORY STORAGE MEDIA

(71) Applicant: Toyota Jidosha Kabushiki Kaisha, Toyota (JP)

(72) Inventors: Takeshi Matsumura, Toyota (JP); Hiroaki Ito, Toyota (JP); Kohsuke Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/388,381

(22) Filed: Jul. 29, 2021

(65) Prior Publication Data

US 2022/0063496 A1 Mar. 3, 2022

(30) Foreign Application Priority Data

Aug. 31, 2020 (JP) .............................. JP2020-145296

(51) Int. Cl.
*B60Q 9/00* (2006.01)
*G06V 20/58* (2022.01)
(Continued)

(52) U.S. Cl.
CPC ................ *B60Q 9/008* (2013.01); *B60R 1/00* (2013.01); *G06V 20/58* (2022.01); *G06V 20/597* (2022.01);
(Continued)

(58) Field of Classification Search
CPC .............. B60Q 9/008; B60K 2370/178; B60K 2370/21; B60K 2370/736; B60K 35/00; B60T 7/12; B60R 1/00; B60R 2300/8093; B60W 2050/146; B60W 2420/42; B60W 2520/10; B60W 2540/10; B60W 2540/12; B60W 2540/225; B60W 2540/229;
(Continued)

(56) References Cited

U.S. PATENT DOCUMENTS

2005/0128063 A1 6/2005 Isaji et al.
2016/0049076 A1 2/2016 Waite
(Continued)

FOREIGN PATENT DOCUMENTS

JP 2015-170113 A 9/2015
JP 2018-013838 A 1/2018

*Primary Examiner* — Farzana Hossain
(74) *Attorney, Agent, or Firm* — Dinsmore & Shohl LLP (57) ABSTRACT

A driving support device includes: a front camera configured to acquire image data; and a controller configured to execute driving support control for supporting driving by a driver of a vehicle when the controller determines that a specific display object exists in front of the vehicle based on the image data. The driving support control is control executed depending on the specific display object. The controller is configured to determine whether a conforming operation is being executed by the driver. The controller is also configured to execute, as the driving support control, control having a higher support level indicating a degree of influence on the driver when the controller determines that the conforming operation is not being executed, as compared with a case where the controller determines that the conforming operation is executed.

6 Claims, 3 Drawing Sheets

(51) Int. Cl.
  *G06V 20/59*     (2022.01)
  *B60R 1/00*      (2022.01)
  *G08G 1/16*      (2006.01)
  *B60K 35/00*     (2006.01)
  *B60T 7/12*      (2006.01)

(52) U.S. Cl.
  CPC .............. *G08G 1/165* (2013.01); *B60K 35/00* (2013.01); *B60K 2370/178* (2019.05); *B60K 2370/21* (2019.05); *B60K 2370/736* (2019.05); *B60R 2300/8093* (2013.01); *B60T 7/12* (2013.01)

(58) Field of Classification Search
  CPC ......... B60W 2555/60; B60W 2556/10; B60W 2720/10; B60W 30/146; B60W 50/14; G06V 20/58; G06V 20/597; G06V 40/18; G08G 1/165
  See application file for complete search history.

(56) References Cited

U.S. PATENT DOCUMENTS

| | | |
|---|---|---|
| 2017/0017851 A1 | 1/2017 | Matsui et al. |
| 2018/0174485 A1* | 6/2018 | Stankoulov .......... G09B 19/167 |
| 2019/0084425 A1* | 3/2019 | Liu ........................... B60L 3/12 |
| 2019/0276022 A1 | 9/2019 | Bae et al. |
| 2019/0311207 A1* | 10/2019 | Oniwa .............. B60W 60/0055 |
| 2022/0144083 A1* | 5/2022 | Seitz ...................... B60K 35/00 |
| 2022/0277570 A1* | 9/2022 | Takamoto ............ G06V 40/168 |

* cited by examiner

DRIVING SUPPORT DEVICE FOR VEHICLE, DRIVING SUPPORT METHOD FOR VEHICLE, AND NON-TRANSITORY STORAGE MEDIA

CROSS-REFERENCE TO RELATED APPLICATION

This application claims priority to Japanese Patent Application No. 2020-145296 filed on Aug. 31, 2020, incorporated herein by reference in its entirety.

BACKGROUND

1. Technical Field

The present disclosure relates to a driving support device for a vehicle, a driving support method for a vehicle, and a non-transitory storage medium.

2. Description of Related Art

Japanese Unexamined Patent Application Publication No. 2018-13838 (JP 2018-13838 A) discloses a driving support device that detects that a driver is diverting his/her line of sight from the front of a vehicle and notifies the driver that the driver is driving inattentively when the driver's line of sight is not directed to the direction of a display object (road sign, etc.) outside the vehicle that is necessary for driving. Such a driving support device can provide appropriate driving support to the driver without performing unnecessary notification control when the driver diverts his/her line of sight from the front of the vehicle to check the right/left side necessary for driving the vehicle, visually recognize the display object, etc.

SUMMARY

However, when the driver's line of sight is directed to the front of the vehicle, there is a possibility that the driver is not visually recognizing the display object existing on the side of the road or above the road. According to the driving support device disclosed in JP 2018-13838 A, when the driver diverts his/her line of sight from the front of the vehicle, it can be determined whether the operation is an operation for visually recognizing the display object. However, it is difficult to determine whether the driver is recognizing the display content of the display object. Therefore, it is difficult for the driving support device disclosed in JP 2018-13838 A to provide appropriate driving support control depending on whether the driver is recognizing the display content of the display object. Further, it is difficult for the driving support device described in JP 2018-13838 A to execute driving support control depending on the traveling state of the vehicle and the state of driving operation by the driver.

The present disclosure provides a driving support device for a vehicle, a driving support method for a vehicle, and a non-transitory storage medium capable of executing appropriate driving support control depending on the situation of driving operation by the driver.

A first aspect of the present disclosure is a driving support device for a vehicle. The driving support device includes: a front camera configured to acquire image data by capturing an image of a scene in front of the vehicle; and a controller configured to execute driving support control for supporting driving by a driver of the vehicle when the controller determines that a specific display object exists in front of the vehicle based on the acquired image data. The driving support control is control executed depending on the specific display object. The controller is configured to determine whether a conforming operation is executed by the driver. The conforming operation is a driving operation that brings a traveling state of the vehicle closer to a state conforming to a display content of the specific display object. The controller is also configured to execute, as the driving support control, control having a higher support level indicating a degree of influence on the driver when the controller determines that the conforming operation is not being executed, as compared with a case where the controller determines that the conforming operation is executed.

According to the first aspect, appropriate driving support control can be executed depending on the situation of the driving operation of the vehicle by the driver, that is, whether the driver has executed a driving operation that brings the traveling state of the vehicle closer to the state conforming to the display content of the specific display object.

In the first aspect, the driving support device may include a sight line detection device configured to detect a direction of a sight line of the driver. The controller may be configured to: determine, based on the direction of the sight line of the driver detected by the sight line detection device, whether the driver visually recognizes the specific display object that is determined to exist; and execute, as the driving support control, the control having the higher support level indicating a degree of influence on the driver when the controller determines that the driver is not visually recognizing the specific display object, as compared with a case where the controller determines that the driver visually recognizes the specific display object.

According to the above configuration, by raising the support level of the driving support when the driver is not visually recognizing the specific display object as compared with a case where the driver has visually recognized the specific display object, appropriate driving support control can be executed depending on the situation of the driver's visual recognition of the specific display object, that is, whether the driver has visually recognized the specific display object.

In the first aspect, the driving support device may include the notification device configured to notify the driver of information about the specific display object. The controller may be configured to execute at least one of notification control and conformity control as the driving support control when the controller determines that the driver is not visually recognizing the specific display object. The notification control is control in which the notification device notifies the driver that the specific display object is detected, and the conformity control is vehicle control for bringing the traveling state of the vehicle closer to the state conforming to the display content of the specific display object. The controller may also be configured to execute the notification control as the driving support control when the controller determines that the driver visually recognizes the specific display object.

When the driver is not visually recognizing the specific display object, it is unlikely that the conforming operation is executed as compared with a case where the driver has visually recognized the specific display object. Therefore, when the driver is not visually recognizing the specific display object, there is a higher need to control the vehicle so that the traveling state of the vehicle conforms to the display content of the specific display object as the driving support, as compared with a case where the driver has visually recognized the specific display object. Therefore, according to the above configuration, it is possible to execute appropriate driving support control depending on the situation of the driver's recognition of the specific display object.

In the first aspect, the controller may be configured to execute the notification control as the driving support control when the controller determines that a degree of discrepancy between the traveling state of the vehicle and the display content of the specific display object is less than a first threshold value and that the driver visually recognizes the specific display object.

According to the above configuration, appropriate driving support control can be executed depending on the traveling situation of the vehicle.

In the first aspect, the controller may be configured to: determine that the degree of the discrepancy is less than the first threshold value and that the driver visually recognizes the specific display object; determine whether the degree of the discrepancy is equal to or greater than a second threshold value and less than the first threshold value, the second threshold value being a value smaller than the first threshold value; and execute the control having the higher support level as the driving support control when the degree of the discrepancy is equal to or greater than the second threshold value and less than the first threshold value, as compared with a case where the degree of the discrepancy is less than the second threshold value.

According to the above configuration, when the degree of discrepancy between the traveling state of the vehicle and the display content of the specific display object is less than the first threshold value, appropriate driving support control can be executed depending on the traveling state of the vehicle.

In the first aspect, the specific display object may be a display object indicating a maximum speed, the degree of the discrepancy may be a magnitude of excess speed of the vehicle from the maximum speed indicated on the specific display object, the conforming operation may be an operation for reducing a speed of the vehicle, and the conformity control may be vehicle control for reducing the speed of the vehicle.

According to the above configuration, when the speed of the vehicle is higher than the maximum speed indicated on the specific display object, it is possible to urge the driver to perform a driving operation for reducing the speed of the vehicle and to reduce the speed of the vehicle. Therefore, it is possible to execute appropriate driving support control depending on the traveling state of the vehicle.

In the first aspect, the controller may be configured to execute, as the driving support control, the control having the higher support level when the number of times determined that the specific display object exists in a predetermined period in a past is lower than a predetermined number of times, as compared with a case where the number of times determined that the specific display object exists is equal to or higher than the predetermined number of times.

When the number of times (number of times of detection) that the specific display object is determined to exist in the predetermined period in the past is high, it is likely that the driver is recognizing the specific display object. Therefore, when the number of times (number of times of detection) that the specific display object is determined to exist in the predetermined period in the past is lower than the predetermined number of times, it is considered to be unknown whether the driver is recognizing the display object, and thus the support level of the driving support is raised as compared with a case where it can be considered that the driver is recognizing the specific display object. According to the above configuration, appropriate driving support control can be executed depending on whether the driver is recognizing the display object.

In the first aspect, the driving support device may include a notification device configured to notify the driver of information about the specific display object. The controller may be configured to execute notification control and conformity control as the driving support control when the controller determines that the number of times determined that the specific display object exists is lower than the predetermined number of times and that the conforming operation is not executed. The controller may be configured to execute the notification control as the driving support control when the number of times the controller determines that the specific display object exists is lower than the predetermined number of times and the driving operation is executed by the driver. The notification control may be control in which the notification device notifies the driver that the specific display object is detected. The conformity control may be vehicle control for bringing the traveling state of the vehicle closer to the state conforming to the display content of the specific display object.

According to the above configuration, appropriate driving support control can be executed depending on the driving situation by the driver.

In the first aspect, the driving support device may include a notification device configured to notify the driver of information about the specific display object. The controller may be configured to execute notification control as the driving support control when a degree of discrepancy between the traveling state of the vehicle and the display content of the specific display object is less than a first threshold value. The notification control may control in which the notification device notifies the driver that the specific display object is detected.

According to the above configuration, appropriate driving support control can be executed depending on the situation of the driving operation by the driver.

In the first aspect, the specific display object may be a display object indicating a maximum speed, the conforming operation may be an operation for reducing a speed of the vehicle, and the conformity control may be control for reducing the speed of the vehicle.

According to the above configuration, when the speed of the vehicle is higher than the maximum speed indicated on the specific display object, it is possible to urge the driver to perform a driving operation for reducing the speed of the vehicle and to reduce the speed of the vehicle. Therefore, it is possible to execute appropriate driving support control depending on the situation of the driving operation of the vehicle.

In the first aspect, the driving support device may include a notification device configured to notify the driver of information about the specific display object. The controller may be configured to execute notification control as the driving support control when a degree of discrepancy between the traveling state of the vehicle and the display content of the specific display object is less than a first threshold value. The notification control may be control in which the notification device notifies the driver that the specific display object is detected.

In the first aspect, the controller may be configured to execute the notification control as the driving support control when a degree of discrepancy between the traveling state of the vehicle and the display content of the specific display object is less than a first threshold value.

In the first aspect, the specific display object may be a display object indicating a maximum speed. The conforming operation may be an operation for reducing a speed of the vehicle. The conformity control may be control for reducing the speed of the vehicle.

A second aspect of the present disclosure is a driving support method for a vehicle. The driving support method includes: a step of determining whether a specific display object exists in front of the vehicle based on image data acquired by capturing an image of a scene in front of the vehicle; a step of executing driving support control for supporting driving by a driver of the vehicle when the specific display object is determined to exist in front of the vehicle; and a step of determining whether a conforming operation is executed by the driver when the specific display object is determined to exist in front of the vehicle. The conforming operation is a driving operation that brings a traveling state of the vehicle closer to a state conforming to a display content of the specific display object. The driving support control is control executed depending on the specific display object. When the conforming operation is determined not to be executed, control having a higher support level indicating a degree of influence on the driver is executed as the driving support control in the step of executing the driving support control, as compared with a case where the conforming operation is determined to be executed.

A third aspect of the present disclosure is a non-transitory storage medium storing instructions that are executable by one or more processors in a computer of a driving support device for a vehicle and that cause the one or more processors to perform the following steps. The steps are: a step of determining whether a specific display object exists in front of the vehicle based on image data acquired by capturing an image of a scene in front of the vehicle; a step of executing driving support control for supporting driving by a driver of the vehicle when the specific display object is determined to exist in front of the vehicle; and a step of determining whether a conforming operation is executed by the driver when it is determined that the specific display object exists in front of the vehicle. The conforming operation is a driving operation that brings a traveling state of the vehicle closer to a state conforming to a display content of the specific display object. The driving support control is control executed depending on the specific display object. When the conforming operation is determined not to be executed, control having a higher support level indicating a degree of influence on the driver is executed as the driving support control in the step of executing the driving support control, as compared with a case where the conforming operation is determined to be executed.

According to the first aspect, the second aspect, and the third aspect of the present disclosure, appropriate driving support control can be executed depending on the situation of the driving operation of the vehicle by the driver, that is, whether the driver has executed a driving operation that brings the traveling state of the vehicle closer to the state conforming to the display content of the specific display object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a driving support device for a vehicle according to each embodiment of the present disclosure will be described. In the following description, the driving support device for the vehicle may be abbreviated as "support device". The support device is mounted on a vehicle. In each of the following embodiments, the support device is mounted on a vehicle having an engine (internal combustion engine) as a driving force source for traveling. However, the support device can be mounted on a vehicle (electric vehicle) having a motor (electric motor) as a driving force source for traveling, and a vehicle (hybrid vehicle) having an engine and a motor as driving force sources for traveling. In addition, display objects set to be detected by the support device include road signs installed on the side of the road and above the road, electric bulletin boards, information boards, and letters, numbers, and symbols written on the road surface. Further, the display objects include display objects having display content that does not change and display objects having display content that changes (for example, display objects that display a moving image, and display objects that switch between display and non-display).

First Embodiment

The support device according to a first embodiment executes driving support control when a display object displaying the maximum speed is detected. The display object that displays the maximum speed includes a road sign (restriction sign) installed on the side of the road and above the road, an electric bulletin board that displays the maximum speed, a number written on the road surface that indicates the maximum speed, etc.

Figure 1:
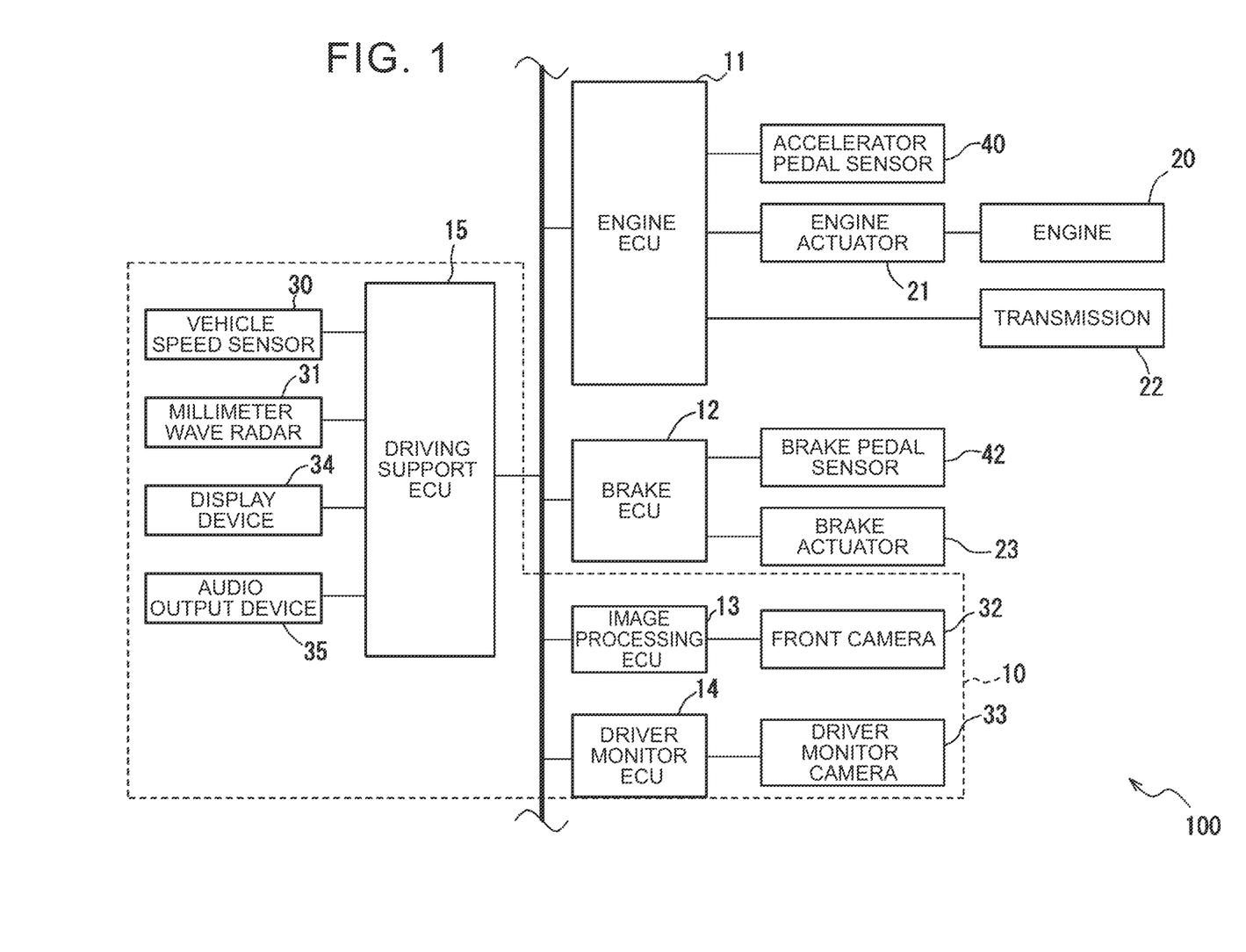
FIG. 1 is a diagram showing a configuration of a vehicle.

As shown in FIG. 1, a vehicle 100 has a support device 10, an engine electronic control unit (ECU) 11, and a brake ECU 12. The support device 10 includes an image processing ECU 13, a driver monitor ECU 14, a vehicle speed sensor 30, a millimeter wave radar 31, a front camera 32, a driver monitor camera 33, a display device 34, and an audio output device 35. Each of the ECUs has a computer having a central processing unit (CPU), read-only memory (ROM), and random access memory (RAM). The CPU sequentially executes a predetermined program (routine) to read data, perform numerical calculation, output a calculation result, and the like. A program executed by the CPU, a look-up table (map), and the like are stored in the ROM in advance. The RAM can temporarily store data. These ECUs are capable of performing data communication (data exchange) with each other via controller area network (CAN).

In addition, the vehicle 100 includes an engine 20 as a driving force source, an engine actuator 21 for controlling the engine 20, a transmission 22 for adjusting the driving force of the engine 20 and transmitting the driving force to driving wheels, and a brake actuator 23 for applying a braking force to each wheel. Further, the vehicle 100 has an accelerator pedal, a shift lever, and a brake pedal (all not shown) as operating members operated by the driver to control the vehicle 100. The accelerator pedal is operated by the driver to change the driving force of the vehicle 100 by adjusting the force generated by the engine 20. The shift lever is operated by the driver to select the shift range (either one of parking range, neutral range, drive range, or reverse range) of the transmission 22. The brake pedal is operated by the driver to apply a braking force to the vehicle 100 for decelerating the vehicle 100.

The engine ECU 11 is connected to an accelerator pedal sensor 40, the engine actuator 21, and the transmission 22. The accelerator pedal sensor 40 is configured to sequentially detect the operation amount (depression amount) of the accelerator pedal. The engine ECU 11 acquires the operation amount of the accelerator pedal from the accelerator pedal sensor 40. The engine ECU 11 controls the engine 20 and the transmission 22 so that the driving force that changes according to the acquired operation amount of the accelerator pedal is transmitted to the driving wheels of the vehicle 100. Further, when the engine ECU 11 receives a driving force change command from a driving support ECU 15, the engine ECU 11 controls the engine 20 and the transmission 22 in response to the driving force change command, so that the driving force transmitted to the driving wheels (hereinafter referred to as "vehicle driving force") can be increased or decreased. That is, the engine ECU 11 can increase or decrease the speed of the vehicle 100 in response to the driving force change command.

The brake ECU 12 is connected to the brake actuator 23. The brake actuator 23 adjusts the hydraulic pressure of hydraulic oil of a friction brake mechanism provided on each of the wheels, and applies a friction braking force corresponding to the hydraulic pressure to each of the wheels. The brake ECU 12 determines the driver-required deceleration based on the operation amount of the brake pedal detected by a brake pedal sensor 42, and controls the brake actuator 23 so that the vehicle 100 decelerates at the driver-required deceleration. Further, when the brake ECU 12 receives a brake command from the driving support ECU 15, the brake ECU 12 controls the operation of the brake actuator 23 so that the vehicle 100 decelerates at the required deceleration included in the brake command. That is, the brake ECU 12 drives the brake actuator 23 in response to the brake command to adjust the braking force applied to the vehicle 100 (hereinafter referred to as "vehicle braking force"), thereby reducing the speed of the vehicle 100.

The front camera 32 sequentially (for example, at a cycle of 100 msec) captures images of a predetermined range in front of the vehicle 100, generates data (image data) of the captured images, and sequentially transmits the generated image data to the image processing ECU 13. "Front" in the present embodiment includes not only the front direction of the vehicle 100 but also the front diagonally upper and lower sides, the front diagonally right and left sides of the vehicle 100. The front camera 32 is installed near a rearview mirror in a vehicle cabin. However, the installation position of the front camera 32 is not particularly limited, and may be, for example, a "predetermined position outside the vehicle cabin of the vehicle 100" such as the central portion of a front bumper and the front portion of a side mirror.

The image processing ECU 13 determines whether a display object preset as a detection target exists in front of the vehicle 100 by performing image recognition processing on the image data sequentially transmitted from the front camera 32. In other words, the image processing ECU 13 detects a display object existing in front of the vehicle 100 and preset as a detection target by image recognition processing. Methods such as pattern matching and Hough transform can be applied to the image recognition processing. Specifically, the image processing ECU 13 performs image processing such as edge detection on the image data acquired from the front camera 32, and extracts the contours of all the objects included in the image. Then, by performing pattern matching processing on the image data that has undergone image processing, it is determined whether a display object set as a detection target exists.

When the image processing ECU 13 determines that a display object (specific display object) indicating the maximum speed exists, that is, when the image processing ECU 13 detects a display object indicating the maximum speed, the image processing ECU recognizes the maximum speed displayed by the specific display object. For convenience of explanation, the maximum speed recognized by the image processing ECU 13 from the display object is referred to as "recognition speed". Further, when the image processing ECU 13 detects a display object set as a detection target in the image data, the image processing ECU 13 cuts out a portion of the display object from the image data, generates new image data, and transmits the new image data to the driving support ECU 15. For convenience of explanation, this image data is referred to as "display object image data". Further, when the image processing ECU 13 detects a specific display object in the image data, the image processing ECU 13 specifies the position of the specific display object with respect to the vehicle 100. This position is referred to as "display object relative position". For example, the image processing ECU 13 specifies the display object relative position from the position of the specific display object in the image data, the installation position of the front camera 32 in the vehicle 100, and the imaging direction thereof. Then, the image processing ECU 13 sequentially tracks the once-detected specific display object by the object tracking method, and sequentially updates the display object relative position. The image processing ECU 13 sequentially transmits the display object relative position to the driving support ECU 15.

The driver monitor camera 33 sequentially (for example, at a cycle of 100 msec) captures images of a range including the face of the driver of the vehicle 100, generates image data, and sequentially transmits the generated image data to the driver monitor ECU 14. The driver monitor camera 33 is disposed in the vehicle cabin so that the driver's face can be imaged. For example, the driver monitor camera 33 is fixed to the upper portion of a steering column cover, a portion of the rearview mirror, or the like.

The driver monitor ECU 14 sequentially acquires image data generated by the driver monitor camera 33, detects feature points from the acquired image data using image processing technology, and detects the face region, the eye region within the face region, the black eye portion, and the like. Since the driver monitor camera 33 is fixed to the vehicle 100 and the imaging direction is also fixed, the position of the driver's face in the vehicle 100 can be specified according to the position and size of the face region in the image data. Then, the driver monitor ECU 14 sequentially calculates the driver's line-of-sight direction from the size of the face region, the position of the eye region within the face region, and the position of the black eye. The driver monitor ECU 14 sequentially transmits the calculated driver's line-of-sight direction to the driving support ECU 15.

The display device 34 is configured to display an image (including figures, characters, and symbols) based on a display command from the driving support ECU 15. By displaying the image on the display device 34, various types of information can be provided to the driver. In particular, the display device 34 displays an image indicating the specific display object detected by using the display object image data to notify the driver of the detection of the specific display object (in other words, the existence of the specific display object) and the display content of the specific display object (that is, information about the specific display object). The display device 34 has, for example, a liquid crystal display, and is disposed at a position where the driver can visually recognize the display content of the display object (for example, a center console in the vehicle cabin). The display device 34 can display, for example, a two-dimensional image in full color, and can be configured by using a liquid crystal display, an organic electro-luminescence (EL) display, a plasma display, or the like. In the present embodiment, the display device 34 is a center display disposed near the center of the instrument panel in the vehicle width direction. However, the display device 34 is not limited to the center display. The display device 34 may be a meter display disposed on the upper portion of the instrument panel on the driver's seat side. Further, the display device 34 may be a head-up display that displays various types of information by projecting a virtual image on a part of the windshield in front of the driver's seat. Further, the display device 34 may be realized by combining a center display, a meter display, a head-up display, and the like.

The audio output device 35 is configured to be able to output sounds based on a sounding command from the driving support ECU 15. Specifically, the audio output device 35 has an amplifier and a speaker.

The vehicle speed sensor 30 is configured to sequentially detect the speed of the vehicle 100 and sequentially output a signal indicating the detected speed of the vehicle 100. The vehicle speed sensor 30 is configured to output a signal that changes according to the speed of the vehicle 100 (that is, the vehicle speed). The driving support ECU 15 acquires the vehicle speed based on the signal from the vehicle speed sensor 30. The vehicle speed sensor 30 may be a wheel speed sensor provided on each of the four wheels included in the vehicle 100.

The millimeter wave radar 31 sequentially transmits millimeter waves (electromagnetic waves having a frequency of 30 G to 300 GHz) to the front of the vehicle 100, and sequentially receives the reflected waves. Then, the millimeter wave radar 31 sequentially acquires the position (relative position) of the target in front of the vehicle 100 with respect to the vehicle 100 and the speed (relative speed) of the target with respect to the vehicle 100 as target information based on the transmitted waves and the reflected waves, and sequentially outputs the acquired target information to the driving support ECU 15.

The driving support ECU 15 executes driving support control that is control executed depending on the display content of a specific display object when the image processing ECU 13 determines that the specific display object (display object displaying the maximum speed in the first embodiment) exists. The driving support control includes control for notifying (warning) the driver of the detection of a specific display object and the content of the specific display object (hereinafter referred to as "notification control"), and control that brings the vehicle 100 closer to the traveling state that conforms to the display content of the display object (hereinafter referred to as "conformity control").

The notification control is control for notifying (warning) the driver that a specific display object has been detected and the content of the specific display object. The notification control includes control for displaying the detected image indicating the specific display object on the display device 34 using the display object image data, and control for causing the audio output device 35 to output a predetermined sound (warning sound, voice announcement, etc.). According to such control, it is possible to notify the driver that a specific display object exists in front of the vehicle 100 (a specific display object is detected) and the display content of the specific display object. As a result, the driver can be urged to execute "a driving operation that brings the traveling state of the vehicle 100 closer to the traveling state that conforms to the display content of the specific display object". Hereinafter, "a driving operation that brings the traveling state of the vehicle 100 closer to the traveling state that conforms to the display content of a specific display object" may be referred to as "conforming operation". The conforming operation in the first embodiment is a driving operation for decelerating the vehicle 100, and specifically includes a reduction in the operation amount (depression amount) of the accelerator pedal and the operation of the brake pedal (or an increase in the operation amount of the brake pedal). The driving support ECU 15 determines whether the conforming operation has been executed based on the operation amount of the accelerator pedal and the operation amount of the brake pedal.

The conformity control is vehicle control for bringing the traveling state of the vehicle 100 closer to the traveling state that conforms to the display content of the specific display object or matching the traveling state of the vehicle 100 with the traveling state that conforms to the display content. The conformity control in the first embodiment is control that automatically decelerates the vehicle 100 by adjusting the vehicle driving force and/or the vehicle braking force when the speed of the vehicle 100 is higher than the recognition speed.

Further, the driving support ECU 15 can execute driving support control having different support levels (control modes). The support level is the degree of intervention in the driving operation of the driver (the magnitude of the degree of influence on the traveling state of the vehicle 100). The higher the degree of intervention in the driving operation of the driver, the higher the support level. The support level will be described in detail later. The degree of intervention in the driving operation of the driver may be the magnitude of the warning level or the magnitude of the vehicle state control for forcibly and automatically changing the traveling state of the vehicle 100.

The driving support ECU 15 (support device 10) executes the first level driving support control, the second level driving support control, and the third level driving support control depending on the situation. Of these three driving support controls, the first level driving support control has the lowest degree of intervention in the driving operation of the driver, and the third level driving support control has the highest degree of intervention in the driving operation of the driver. The degree of intervention of the second level driving support control in the driving operation is between the degree of intervention of the first level driving support control in the driving operation and the degree of intervention of the third level driving support control in the driving operation.

More specifically, the driving support ECU 15 executes notification control for displaying the content of a specific display object on the display device 34 as the first level driving support control. As the second level driving support control, the driving support ECU 15 executes notification control for displaying the content of the specific display object on the display device 34 and causing the audio output device 35 to output a warning sound. As the third level driving support control, the driving support ECU 15 executes conformity control for decelerating the vehicle 100 in addition to notification control for displaying the content of the specific display object on the display device 34 and causing the audio output device 35 to output a warning sound.

Further, the driving support ECU 15 determines the degree of discrepancy between the actual traveling state of the vehicle 100 and the traveling state that conforms to the display content of the specific display object. In the present embodiment, the "actual traveling state of the vehicle 100" is the speed of the vehicle 100, and the "traveling state that conforms to the display content of the specific display object" is "a state where the vehicle 100 is traveling at a speed equal to or lower than the maximum speed (recognition speed) displayed on the specific display object". This "degree of discrepancy" is "the magnitude of the excess speed from the maximum speed displayed on the display object". That is, when the speed of the vehicle 100 is higher than the recognition speed, the larger the difference between the speed of the vehicle 100 and the recognition speed, the greater this degree of discrepancy. The greater this degree of discrepancy, the greater the need (urgency) for the traveling state of the vehicle 100 to be brought into a traveling state that conforms to the display content of the specific display object. Therefore, the driving support ECU 15 raises the support level of the driving support control as this degree of discrepancy increases. Specifically, threshold values (first threshold value $\alpha$ and second threshold value $\beta$) are set in advance in the driving support ECU 15 for the excess speed from the recognition speed (that is, "degree of discrepancy"). When the magnitude of the excess speed from the recognition speed of the vehicle 100 is equal to or greater than the threshold values (or greater than the threshold values), the driving support ECU 15 raises the support level of the driving support control as compared with a case where the magnitude of the excess speed from the recognition speed of the vehicle 100 is less than the threshold values (or equal to or less than the threshold values).

The content of the "discrepancy" is determined according to the display content of the specific display object. For example, when the specific display object is a road sign indicating the minimum speed, the "traveling state that conforms to the display content of the specific display object" is "a state where the vehicle 100 is traveling at a speed equal to or higher than the minimum speed (recognition speed) displayed on the specific display object". The "degree of discrepancy" in this case is "the magnitude of the lacking speed from the minimum speed (recognition speed) displayed on the display object". That is, when the speed of the vehicle 100 is lower than the recognition speed, the larger the difference between the speed of the vehicle 100 and the recognition speed, the greater the degree of discrepancy with the actual traveling speed of the vehicle 100. When the display object indicates a traveling lane, the "traveling state that conforms to the display content of the display object" is "a state where the vehicle 100 is traveling within the traveling lane". The "degree of discrepancy" in this case is the "magnitude of displacement of the vehicle 100 from the traveling lane". That is, the larger the displacement of the vehicle 100 from the traveling lane, the greater the degree of discrepancy with the actual traveling state of the vehicle 100.

When the driving support ECU 15 determines that a "display object displaying the maximum speed" exists as a specific display object, the driving support ECU 15 executes one of the first level driving support control to the third level driving support control depending on the situation described below.

Case 1

When the vehicle speed is lower than a value obtained by adding the first threshold value $\alpha$ ($\alpha>0$) to the maximum speed (that is, the recognition speed) displayed on the specific display object (1-1) In the case where it is determined that the driver has visually recognized the specific display object, when the vehicle speed is lower than "a value obtained by adding the second threshold value $\beta$ ($0<\beta<\alpha$) to the recognition speed", the driving support ECU 15 executes the first level driving support control.

(1-2) In the case where it is determined that the driver has visually recognized the specific display object, when the vehicle speed is equal to or higher than "a value obtained by adding the second threshold value $\beta$ to the recognition speed", the driving support ECU 15 executes the second level driving support control.

(1-3) When it is determined that the driver is not visually recognizing the specific display object, the driving support ECU 15 executes the third level driving support control.

Case 2

When the vehicle speed is equal to or higher than "the value obtained by adding the first threshold value $\alpha$ to the recognition speed"

(2-1) In the case where it is determined that the driver has visually recognized the specific display object, when it is determined that the conforming operation is being performed based on the driver's visual recognition of the specific display object, the driving support ECU 15 executes the first level driving support control.

(2-2) In the case where it is determined that the driver has visually recognized the specific display object, when it is determined that the conforming operation is not being performed based on the driver's recognition of the specific display object, the driving support ECU 15 executes the second level driving support control. It is determined that the conforming operation is not being performed based on the driver's visual recognition in either cases of: the case where the conforming operation is not being performed; or the case where even when the conforming operation has been performed, the conforming operation is not an operation based on the visual recognition of the specific display object.

(2-3) When it is determined that the driver is not visually recognizing the specific display object, the driving support ECU 15 executes the third level driving support control.

In this way, the driving support ECU 15 changes the support level of the driving support control (contents of the driving support control) depending on whether the driver has visually recognized the specific display object, whether the driver has performed a driving operation corresponding to the display content of the specific display object, etc. Therefore, the driving support ECU 15 can provide appropriate driving support control to the driver. Particularly, when the driver is not visually recognizing the specific display object, the driving support ECU 15 executes the third level driving support control including the conformity control. Therefore, the driving support ECU 15 can improve the safety when the driver overlooks the display object.

Next, the specific operation of the driving support ECU 15 will be described. When the driving support control (that is, any one of the first level driving support control to the third level driving support control) is not being executed, the CPU of the driving support ECU 15 repeatedly executes a "driving support control start routine" indicated in the flowchart of FIG. 2 every time a predetermined time elapses. The CPU of the driving support ECU 15 is also simply referred to as a "CPU". Once the driving support control is started, the CPU continues the driving support control until the predetermined control execution time elapses. The computer program for executing this driving support control start routine is stored in the ROM of the driving support ECU 15 in advance. The CPU of the driving support ECU 15 reads this computer program from the ROM and executes the computer program. As a result, the driving support control start routine is executed.

Figure 2:
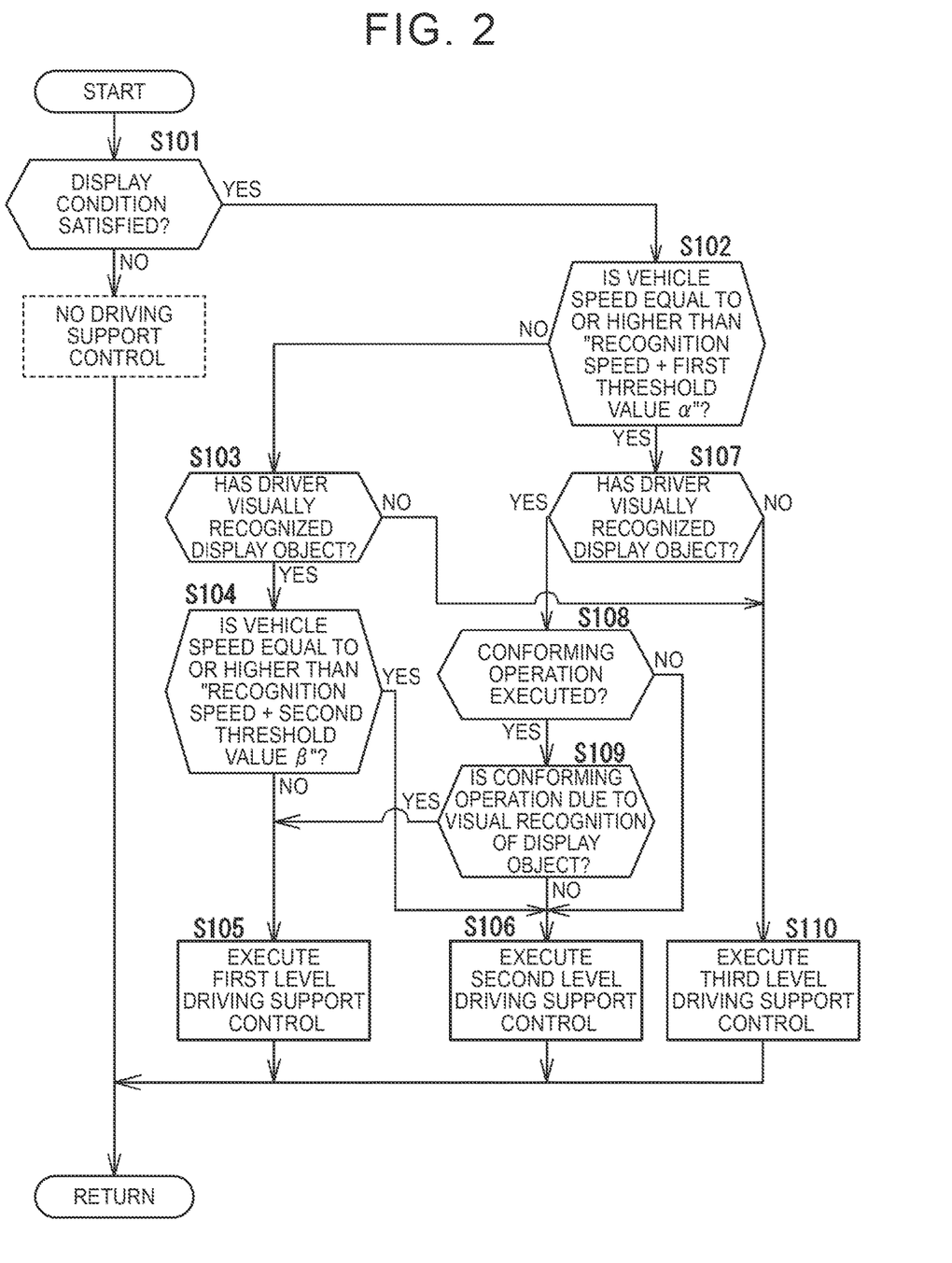
FIG. 2 is a flowchart showing a driving support control start routine according to a first embodiment.

In step S101, the CPU determines whether the display condition is satisfied. Specifically, the CPU determines that the display condition is satisfied when a display object (specific display object) displaying the maximum speed is detected by the image processing ECU 13.

When the CPU determines that the display condition is not satisfied, the CPU temporarily ends this routine without starting the driving support control. Therefore, when the driving support control is not being executed, the driving support control is not started until the time when the "display object displaying the maximum speed" is newly detected.

When the CPU determines in step S101 that the display condition is satisfied, the CPU proceeds to step S102 and determines whether the vehicle speed at the time when the display condition is satisfied is equal to or higher than "recognition speed+first threshold value α". The first threshold value a is a threshold value for determining the degree of discrepancy with the traveling state that conforms to the display content of the specific display object. The first threshold value is a positive value (for example, 10 km/h). However, the specific value of the first threshold value α is not limited. Further, the value of the first threshold value α may be a different value depending on the recognition speed. When the CPU determines that the vehicle speed is a value lower than "recognition speed+first threshold value α", the CPU proceeds to step S103.

In step S103, the CPU determines whether the driver has visually recognized the specific display object. Specifically, the CPU sequentially acquires the direction of the driver's line of sight detected by the driver monitor ECU 14. The CPU determines whether the direction of the driver's line of sight is directed in the direction in which the specific display object exists with respect to the driver (hereinafter referred to as "display object direction") continuously for a predetermined time (for example, 0.5 seconds) or more during the period from the time when the specific display object is detected by the image processing ECU 13 to the time when the vehicle 100 passes the specific display object (referred to as "driver recognition allowable period"). The driving support ECU 15 calculates the display object direction from the display object relative position of the specific display object sequentially calculated by the image processing ECU 13 and the position of the driver's head in the vehicle 100 sequentially detected by the driver monitor ECU 14. When the CPU determines that the driver has visually recognized the specific display object, the CPU proceeds to step S104.

In step S104, the CPU determines whether the vehicle speed is equal to or higher than "recognition speed+second threshold value β". Like the first threshold value α, the second threshold value β is a threshold value for determining the degree of discrepancy with the traveling state that conforms to the display content of the specific display object. The second threshold value β is a value larger than zero and smaller than the first threshold value α (for example, 5 km/h). However, the specific value of the second threshold value β is not limited. When the vehicle speed at this time (or at the time when the display condition is satisfied) is lower than "recognition speed+second threshold value β", the CPU proceeds to step S105 and executes the above-mentioned first level driving support control. On the other hand, when the vehicle speed is equal to or higher than "recognition speed+second threshold value β", the CPU proceeds to step S106 and executes the above-mentioned second level driving support control. According to such a driving support control start routine, the support level of the driving support control can be changed depending on the degree of discrepancy between the "display content of the display object" and the "actual traveling state of the vehicle 100". Specifically, the greater the degree of discrepancy is (that is, when the vehicle speed is higher than the recognition speed, the larger the difference is), the higher the support level of the driving support control can be. Therefore, it is possible to provide driving support control suitable for the actual traveling state of the vehicle 100.

When the CPU determines in step S102 that the vehicle speed is equal to or higher than "recognition speed+first threshold value α", the CPU proceeds to step S107. In step S107, the CPU determines whether the driver has visually recognized the display object in the same manner as in step S103. When the CPU determines that the driver has visually recognized the specific display object, the CPU proceeds to step S108.

In step S108, the CPU determines whether the conforming operation has been executed. For example, the CPU determines whether the operation amount of the accelerator pedal is reduced compared to the operation amount of the accelerator pedal at the time when the specific display object is detected, and whether the operation amount of the brake pedal is increased (including whether the brake pedal is operated) compared to the operation amount of the brake pedal at the time when the specific display object is detected. The CPU determines that the conforming operation has been executed when the CPU determines that the operation amount of the accelerator pedal is reduced compared to the operation amount of the accelerator pedal at the time when the specific display object is detected, or when the operation amount of the brake pedal is increased compared to the operation amount of the brake pedal at the time when the specific display object is detected. That is, when the driving operation for decelerating the vehicle 100 is performed, the CPU determines that the conforming operation has been executed. When the CPU determines that the conforming operation has been executed, the CPU proceeds to step S109.

In step S109, the CPU determines whether the conforming operation determined to have been executed in step S108 is an operation that has been executed when the driver visually recognized the specific display object. Specifically, the CPU determines that the conforming operation is an operation that has been executed by visually recognizing the specific display object when the conforming operation has been executed during the period (conforming operation allowable period) from the time when it is determined that the driver's line of sight is directed to the specific display object to the time when a predetermined time (for example, 1 sec) elapses.

Note that the CPU may determine that the conforming operation has been executed by the driver visually recognizing the specific display object when the conforming operation is executed in the conforming operation allowable period and there is no "factor for executing the conforming operation other than the visual recognition of the specific display object". For example, when the driver visually recognizes an object or the like existing in front of the vehicle 100 in the traveling direction, the driver may decelerate the vehicle 100 regardless of the existence of the specific display object in order to avoid contact with the object or the like. In such a case, the CPU determines that there is a factor for executing the conforming operation other than the visual recognition of the specific display object. That is, the "factors for executing the conforming operation other than the visual recognition of the specific display object" include that another vehicle 100 exists in front of the vehicle 100, an obstacle exists in front of the vehicle 100 in the traveling direction, a traffic light existing in front of the vehicle 100 in the traveling direction is indicating a stop, a stop sign exists in front of the vehicle 100 in the traveling direction, the vehicle 100 is involved in a traffic jam, and the like.

Based on the target information acquired by the millimeter wave radar 31, the CPU determines whether there is a vehicle 100 traveling in front of (immediately before) the vehicle 100, and whether an object exists in front of the vehicle 100 in the traveling direction, according to a predetermined method. Further, based on the result of image processing by the image processing ECU 13, the CPU determines whether a traffic light existing in front of the vehicle 100 in the traveling direction is indicating a stop, and whether there is a stop sign in front of the vehicle 100 in the traveling direction. Further, the CPU determines whether the vehicle 100 is involved in a traffic jam based on the slope of the road, traffic jam information transmitted from the outside of the vehicle 100, and the like. The CPU determines whether there is a "factor for executing the conforming operation other than the visual recognition of the display object" according to these determination results.

When the CPU determines that the conforming operation is an operation that has been executed by visually recognizing the specific display object, the CPU proceeds to step S105 and executes the above-mentioned first level driving support control.

On the other hand, when the CPU determines in step S109 that the conforming operation has been executed due to a factor other than the visual recognition of the specific display object, or when the CPU determines in step S108 that the conforming operation has not been executed, the CPU proceeds to step S106. The CPU executes the above-mentioned second level driving support control in step S106. According to such a driving support control start routine, when the conforming operation has been executed and the conforming operation has been executed due to the driver's visual recognition of the specific display object, the support level of the driving support control can be lowered as compared with the case where there is no conforming operation and the case where the conforming operation has been executed by a factor other than the visual recognition of the specific display object. Therefore, according to such a driving support control start routine, the support level of the driving support control can be set to a level suitable for the situation of the driving operation by the driver.

When the CPU determines in step S103 or step S107 that the driver is not visually recognizing the specific display object, the CPU proceeds to step S110 and executes the above-mentioned third level driving support control.

According to such a driving support control start routine, when it is determined that the driver is not visually recognizing the specific display object, it is possible to execute driving support control having a higher support level as compared with the case where it is determined that the driver has visually recognized the specific display object. When it is determined that the driver is not visually recognizing the specific display object, it can be considered that the driver is unlikely to execute the conforming operation. Therefore, as described above, when the CPU determines that the driver is not visually recognizing the specific display object (S103: NO and S107: NO), the CPU executes the third level driving support control including not only notification control but also conformity control. Therefore, with the conformity control, the traveling state of the vehicle 100 can be changed to a traveling state suitable for the display content of the specific display object, or can be brought closer to the traveling state suitable for the display content of the specific display object.

In this driving support control start routine, the driving support control is executed (that is, the display device 34 displays an image of the specific display object) at a timing after the determination (step S103 or step S107) of whether the driver has visually recognized the specific display object, but the order is not limited to this. For example, when the display condition is satisfied in step S101, the order may be such that the display device 34 displays an image of the specific display object, and then, when the process proceeds to step S105, the above process is maintained, when the process proceeds to step S106, the second level driving support control is executed, and when the process proceeds to step S110, the third level driving support control is executed. In other words, when the display condition is satisfied in step S101, the order may be such that the first level driving support control or "driving support control including only notification control" having a lower support level than the first level driving support control is promptly executed (for example, before step S103 or step S107), and then the support level of the driving support control is maintained or changed (one of the first level driving support control to the third level driving support control is executed) depending on whether the process proceeds to step S105, step S106, or step S110.

Further, although the CPU determines in step S109 whether the conforming operation is an operation due to the visual recognition of the specific display object, this determination need not be performed. In this case, when the CPU determines in step S108 that the conforming operation has been executed, the CPU proceeds to step S105 to execute the first level driving support control, and when the CPU determines that the conforming operation has not been executed, the CPU proceeds to step S106 to execute the second level driving support control.

Further, in the driving support control start routine described above, when the driver is recognizing the specific display object, the support level of the driving support control is changed depending on whether the speed of the vehicle 100 is equal to or higher than "recognition speed+ second threshold value $\beta$". However, the routine is not limited to this. That is, as the value of the second threshold value $\beta$ becomes smaller, the significance of changing the support level of the driving support control depending on whether the speed of the vehicle 100 is equal to or higher than "recognition speed+second threshold value $\beta$" becomes smaller. Since the second threshold value $\beta$ is a value smaller than the first threshold value $\alpha$ and is restricted by the value of the first threshold value $\alpha$, step S104 may be omitted depending on the magnitude of the first threshold value $\alpha$. In the driving support control start routine that omits step S104, when the CPU determines in step S103 that the driver has visually recognized the specific display object, the CPU proceeds to either step S105 or step S106.

Further, in the driving support control start routine described above, the CPU determines whether the speed of the vehicle 100 is equal to or higher than "recognition speed+first threshold value α" when the display condition is satisfied, and then the CPU determines whether the driver has recognized the specific display object. However, the order is not limited to this. For example, the CPU may determine whether the driver is visually recognizing the specific display object when the display condition is satisfied (that is, between step S101 and step S102). In this case, when the CPU determines that the driver is not visually recognizing the specific display object, the CPU proceeds to step S110 to execute the third level driving support control. When the CPU determines that the driver has visually recognized the specific display object, the CPU determines whether the vehicle speed at that time is lower than "recognition speed+second threshold value β", within a range equal to or higher than "recognition speed+second threshold value β" and lower than "recognition speed+first threshold value α", or equal to or higher than "recognition speed+first threshold value α". When the vehicle speed is lower than "recognition speed+second threshold value α", the CPU proceeds to step S105 to execute the first level driving support control, and when the vehicle speed is within the range equal to or higher than "recognition speed+second threshold value β" and lower than "recognition speed+first threshold value α", the CPU proceeds to step S106 to execute the second level driving support control. Further, when the vehicle speed is equal to or higher than "recognition speed+first threshold value α", the CPU determines whether the conforming operation has been executed by the driver, and changes the support level of the driving support control depending on the determination result.

The above-mentioned first level, second level, and third level driving support controls are examples, and the driving support control is not limited thereto. For example, these driving support controls may be controls described below.

Combination Example 1

First level: The CPU executes notification control of displaying a still image of a detected display object (specific display object) on the display device 34.
Second level: The CPU executes notification control of displaying a moving image of a specific display object (for example, a screen for blinking the specific display object) on the display device 34.
Third level: The CPU executes both the notification control of the second level and the above-mentioned conformity control.

Combination Example 2

First level: The CPU executes notification control that causes the display device 34 to display a still image of a specific display object and the audio output device 35 to output a warning sound.
Second level: The CPU executes notification control that causes the display device 34 to display a still image of a specific display object and the audio output device 35 to output a warning sound louder than that of the first level.
Third level: The CPU executes both the notification control of the second level and the above-mentioned conformity control.

Combination Example 3

First level: The CPU executes notification control that causes the display device 34 to display a still image of a specific display object and the audio output device 35 to output a warning sound.
Second level: The CPU executes notification control that causes the display device 34 to display a moving image of a specific display object and the audio output device 35 to output a warning sound louder than that of the first level.
Third level: The CPU executes both the notification control of the second level and the above-mentioned conformity control.

Note that the first level driving support control to the third level driving support control only need to include notification control and need not include conformity control. For example, the following combinations may be used.

Combination Example 4

First level: The CPU executes notification control of displaying a still image of a specific display object on the display device 34.
Second level: The CPU executes notification control that causes the display device 34 to display a moving image of a specific display object and the audio output device 35 to output a warning sound.
Third level: The CPU executes notification control that causes the display device 34 to display a moving image of a specific display object (however, a moving image of a movement more intense than that of the second level) and the audio output device 35 to output a warning sound louder than that of the second level.

Combination Example 5

First level: The CPU executes notification control of displaying a still image of a specific display object on the display device 34.
Second level: The CPU executes notification control of displaying a moving image of a specific display object (for example, a screen for blinking the specific display object) on the display device 34. Third level: The CPU executes notification control that causes the display device 34 to display a moving image of a specific display object (for example, a screen for blinking the specific display object) and the audio output device 35 to output a warning sound.

In this way, the support level of the driving support control can be set to various levels. For example, the more easily the driver can recognize the notification (warning), the higher the support level is when the driving support control is the notification control accompanied by displaying an image on the display device 34 and does not include the conformity control. More specifically, the support level of the notification control of displaying a moving image (including blinking of an image and enlargement/reduction of an image) on the display device 34 is higher than the support level of the notification control of displaying a still image on the display device 34. Further, when displaying a moving image on the display device 34, the higher the image changing speed (including the blinking speed, the enlargement/reduction speed, the movement amount of the image per unit time, etc.), the higher support level.

When the driving support control is the notification control accompanied by the sounding of a warning sound by the audio output device 35 and does not include the conformity control, the support level increases as the volume of the warning sound increases. Further, when the driving support control is the notification control and does not include the conformity control, the support level of the notification control that causes the display device 34 to display a specific image (one of a still image and a moving image) in a specific mode and the audio output device 35 to generate a specific warning sound is higher than the support level of the notification control that causes the display device 34 to display the specific image in the specific mode but does not cause the audio output device 35 to generate a warning sound. Similarly, the support level of the notification control that causes the display device 34 to display a specific image in a specific mode and the audio output device 35 to generate a specific warning sound is higher than the support level of the notification control that causes the audio output device 35 to generate the specific warning sound but does not cause the display device 34 to display the specific image in the specific mode.

Further, the support level of the driving support control that executes both the notification control and the conformity control is higher than that of the driving support control that executes only the notification control. Further, for two types of driving support controls that execute the same notification control and execute different conformity controls, the support level of the driving support control is higher when the conformity control has a larger vehicle control amount that is changed in the conformity control (for example, the vehicle deceleration or the control amount for controlling the vehicle deceleration, namely, the control amount of the vehicle driving force and the control amount of the vehicle braking force).

Second Embodiment

Next, a second embodiment will be described. The configurations common to those of the first embodiment are designated by the same reference signs as those of the first embodiment, and the description thereof will be omitted. The second embodiment is a process in which the driver is recognizing the existence of a specific display object but intentionally does not direct his/her line of sight to the specific display object. That is, the driver may be recognizing display objects existing on a frequently passing road. In that case, the driver may intentionally not direct his/her line of sight to those display objects. In the first embodiment, in such a case, the third level driving support control is executed. However, when the driver does not direct his/her line of sight to the specific display object but is recognizing the existence of the display object, the support level of the driving support control may be lowered compared with the case where the driver overlooks the specific display object. For example, when the driver is recognizing a specific display object but does not intentionally direct his/her line of sight to the display object, it is not necessary to execute the conformity control.

The vehicle 100 according to the second embodiment is configured so that the current position can be detected. The vehicle 100 has a global positioning system (GPS) receiver (not shown). The driving support ECU 15 (support device 10) can sequentially (for example, every 100 msec) acquire the detection result of the current position (longitude and latitude) of the vehicle 100 by the GPS receiver. Further, the driving support ECU 15 (support device 10) has a database of display objects and a database of a detection history of display objects. The database of display objects contains the positions (longitude and latitude) of the display objects and the display contents of the display objects. The database of the detection history of the display objects contains the detection dates and times of the display objects. Every time the driving support ECU 15 detects the display objects, the database of the detection history of the display objects is updated. Therefore, the driving support ECU 15 can acquire the past detection history of the detected display objects, specifically, the number of times the display objects are detected within a predetermined period in the past.

In the present embodiment, when the number of times a specific display object is detected, that is, the detection frequency (meaning the number of times of detection within a predetermined period in the past, for example, within the past two months) is equal to or higher than a threshold value, it is considered that the driver is recognizing the existence of the specific display object. Therefore, when the driving support ECU 15 detects a display object and the detection frequency of the detected display object is equal to or higher than the threshold value, the driving support ECU 15 lowers the support level of the driving support control as compared with the case where the detection frequency is lower than the threshold value.

Specifically, in the case where the driving support ECU 15 detects a specific display object, when the speed of the vehicle 100 is lower than "recognition speed+first threshold value α" and the detection frequency of the specific display object is equal to or higher than the threshold value (the number of times of detection is equal to or higher than the predetermined number of times), the first level driving support control is executed. On the other hand, in the case where the driving support ECU 15 detects a specific display object, when the speed of the vehicle 100 is lower than "recognition speed+first threshold value α" and the detection frequency of the specific display object is lower than the threshold value (the number of times of detection is equal to or lower than the predetermined number of times), the second level driving support control is executed. That is, when it is determined that the driver is recognizing the specific display object, the driving support ECU 15 executes only the notification control and does not execute the conformity control. However, when the degree of discrepancy between the traveling state of the vehicle 100 and the display content of the specific display object is equal to or greater than the threshold value, the support level of the driving support control is increased compared with the case where the degree of discrepancy is less than the threshold value.

Further, in the case where the driving support ECU 15 detects a specific display object, when the speed of the vehicle 100 is equal to or higher than "recognition speed+first threshold value α" and the detection frequency of the specific display object is lower than the threshold value, the driving support ECU 15 determines whether the conforming operation has been executed. The driving support ECU 15 executes the first level driving support control or the second level driving support control when the conforming operation has been executed, and executes the third level driving support control when the conforming operation is not executed. That is, when the conforming operation has been executed, the driving support ECU 15 lowers the support level of the driving support control as compared with the case where the conforming operation is not executed. When the conforming operation has been executed, the driving support ECU 15 executes the notification control but does not execute the conformity control.

Next, the specific operation of the driving support ECU 15 will be described. The CPU of the driving support ECU 15 repeatedly executes the "driving support control start routine" indicated by the flowchart of FIG. 3 every time a predetermined time elapses. Note that step S201 and step S202 are the same as step S101 and step S102 in the first embodiment, respectively. Further, the process when the display condition is not satisfied in step S201 is the same as the process when the display condition is not satisfied in step S101.

Figure 3:
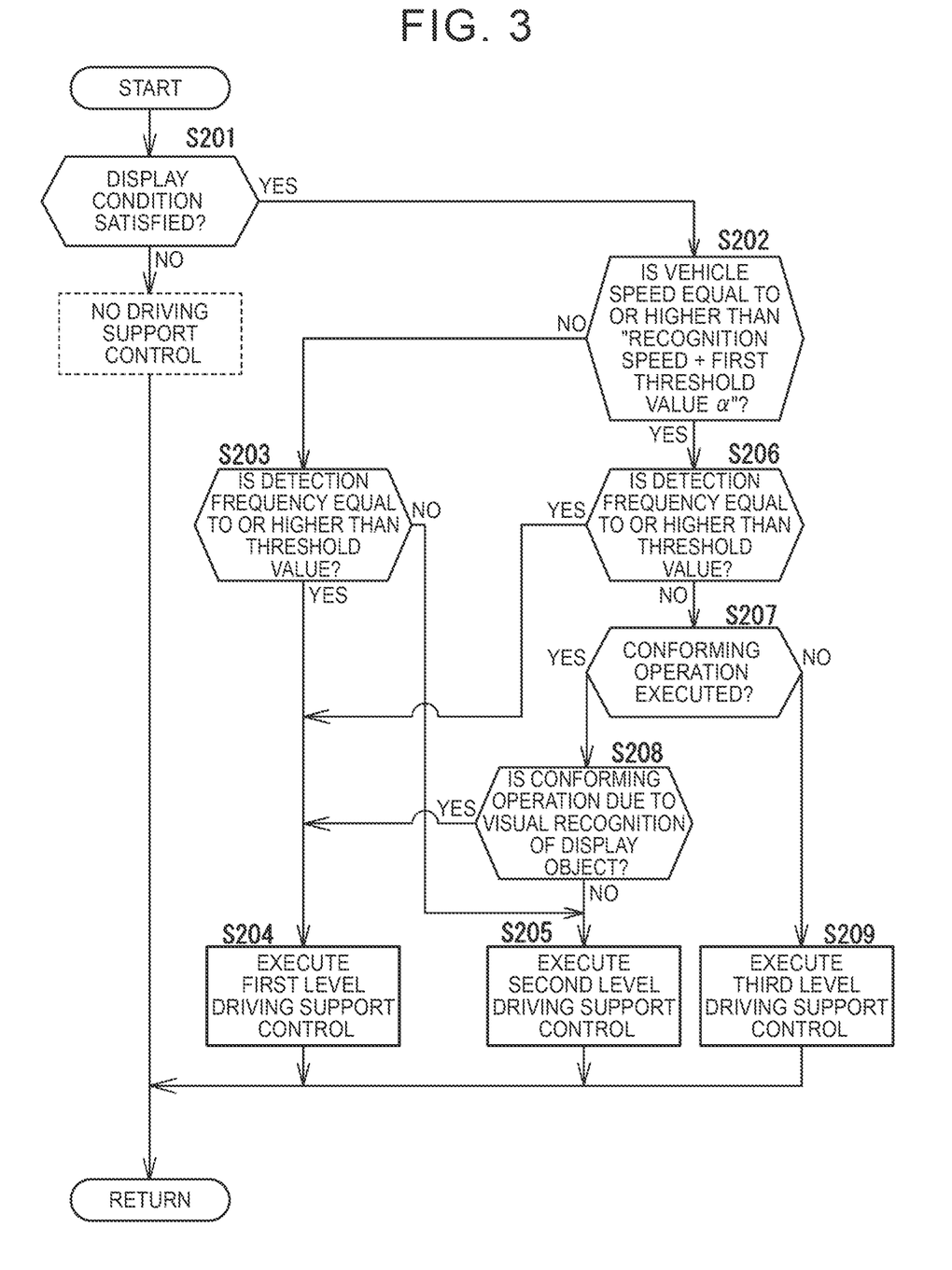
FIG. 3 is a flowchart showing a driving support control start routine according to a second embodiment.

When the speed of the vehicle 100 is lower than "recognition speed+first threshold value α" in step S202, the CPU proceeds to step S203. In step S203, the CPU determines whether the detection frequency of the specific display object detected in step S201 is equal to or higher than the threshold value. When the detection frequency is equal to or higher than the threshold value, the CPU determines that the driver is aware of the existence of the display object. Therefore, in this case, the process proceeds to step S204, and the CPU executes the first level driving support control. On the other hand, when the CPU determines in step S203 that the detection frequency is lower than the threshold value, the CPU determines that the driver is not recognizing the specific display object or it is unknown whether the driver is recognizing the specific display object. Then, the process proceeds to step S205, and the CPU executes the second level driving support control.

When the CPU determines in step S202 that the speed of the vehicle 100 is equal to or higher than "recognition speed+first threshold value α", the CPU proceeds to step S206. In step S206, the CPU determines whether the detection frequency of the specific display object is equal to or higher than the threshold value, as in step S203. When the detection frequency is equal to or higher than the threshold value, the CPU proceeds to step S204 and executes the first level driving support control. That is, in this case, the CPU executes the notification control of notifying the detection of the specific display object but does not execute the conformity control as the driving support control.

On the other hand, when the CPU determines in step S206 that the detection frequency is lower than the threshold value, the CPU determines that the driver is not recognizing the existence of the specific display object. In this case, the CPU proceeds to step S207. In step S207, the CPU determines whether the conforming operation has been executed. When the CPU determines that the conforming operation has been executed, the CPU proceeds to step S208.

In step S208, the CPU determines whether the conforming operation is due to the visual recognition of the specific display object. In step S208, when the CPU determines that the conforming operation is due to the visual recognition of the specific display object, the CPU proceeds to step S204. When the CPU determines that the conforming operation is not due to the visual recognition of the specific display object, the CPU proceeds to step S205.

When the CPU determines in step S207 that the conforming operation is not being executed, the CPU proceeds to step S209. In step S209, the CPU executes the third level driving support control. In this way, when it is determined that the degree of discrepancy between the traveling state of the vehicle 100 and the display content of the specific display object is equal to or greater than the threshold value, the detection frequency of the specific display object is lower than the threshold value, and the conforming operation is not being executed, the support level of the driving support control is increased as compared with other cases. In particular, in this case, the conformity control is executed in addition to the notification control as the driving support control.

In the driving support control start routine described above, it is determined whether the detection frequency of the specific display object is equal to or lower than the threshold value, but the routine is not limited to this. For example, also in the second embodiment, it may be determined whether the driver has visually recognized the specific display object. Specifically, a step of determining whether the driver has visually recognized the specific display object may be added between steps S202 and S203. In this case, a routine can be applied such that when it is determined in this step that the driver has visually recognized the specific display object, the process proceeds to step S204, and when it is determined that the driver is not visually recognizing the object, the process proceeds to step S203. Further, a step for determining whether the driver has visually recognized the specific display object may be added between step S202 and step S206. In this case, a routine can be applied such that when it is determined in this added step that the driver has visually recognized the specific display object, the process proceeds to step S204 or step S205, and when it is determined that the driver is not visually recognizing the specific display object, the process proceeds to step S206.

Further, a step (step S104 in the first embodiment) for determining whether the speed of the vehicle 100 is equal to or higher than "recognition speed+second threshold value β" may be added between step S203 and step S204. Then, a routine can be applied such that when it is determined that the speed of the vehicle 100 is equal to or higher than "recognition speed+second threshold value β", the process proceeds to step S205, and when it is determined that the speed of the vehicle 100 is lower than "recognition speed+second threshold value β", the process proceeds to step S204.

Further, in the driving support control start routine described above, in steps S203 and S206, it is determined whether the detection frequency of the specific display object is equal to or higher than the threshold value, and it is determined whether the driver is recognizing the specific display object based on the determination result. However, the routine is not limited to this. For example, when the frequency of passing through a predetermined road is high, it can be considered that the existence of the display object installed on the predetermined road is being recognized by the driver. Therefore, the following modification can be applied when traveling on a road with a high passing frequency.

In the driving support control start routine according to the modification, the CPU determines in step S206 whether the driver has visually recognized the specific display object, and when the CPU determines that the driver has recognized the specific display object, the CPU proceeds to step S204 and executes the first level driving support control. Alternatively, the CPU may proceed to step S205 and execute the second level driving support control. In the driving support control start routine according to the modification, when the CPU determines in step S206 that the driver is not recognizing the specific display object, the CPU proceeds to step S207 and determines whether the conforming operation has been executed. When the CPU determines in step S207 that the conforming operation is not being executed, the CPU proceeds to step S209 and executes the third level driving support control. On the other hand, when the CPU determines that the conforming operation has been executed in step S207, the CPU proceeds to step S208 and determines whether the conforming operation is due to the visual recognition of the specific display object. According to this determination result, the CPU proceeds to step S204 and executes the first level driving support control, or the CPU proceeds to step S205 and executes the second level driving support control. As described above, in the driving support control start routine according to the modification, when the driver is recognizing the specific display object but has not directed his/her line of sight to the display object and the conforming operation is not executed, the third level driving support control is executed. In the driving support control start routine according to this modification, step S203 may be omitted, and when the speed of the vehicle 100 is lower than "recognition speed+first threshold value α" in step S202, the process may proceed to step S204 and execute the first level driving support control.

In the case of the driving support control start routine according to the modification, when the driver is recognizing the existence of a specific display object but has not directed his/her line of sight to the specific display object, appropriate driving support control can be executed depending on the situation of the driving operation by the driver. That is, in the first embodiment, when the speed of the vehicle is equal to or higher than "recognition speed+α" ("YES" in step S102) and the driver is not visually recognizing the specific display object ("NO" in step S107), the CPU executes the third level driving support control, that is, the notification control and the conformity control. However, when the driver is recognizing the existence of the specific display object but has not directed his/her line of sight to the specific display object, there is less need to perform the conformity control compared with the case where the driver is not recognizing the specific display object. Therefore, in such a case, when the speed of the vehicle is equal to or higher than "recognition speed+first threshold value α" ("YES" in step S202), the driver is not visually recognizing the specific display object ("NO" in step S206), and the conforming operation is not executed ("NO" in step S207), the CPU executes the third level driving support control. On the other hand, when the conforming operation has been executed ("YES" in step S207), the CPU executes the second level driving support control. With such a driving support control start routine, even when the driver is not visually recognizing a specific display object, appropriate driving support control can be executed depending on the situation of the driving operation by the driver.

As a precondition of executing the driving support control start routine according to the modification, for example, in a timing prior to step S201, the CPU uses the detection result of the current position of the vehicle 100 by the GPS receiver to determine whether the passing frequency of the currently passing road is equal to or higher than the threshold value (whether the number of passing times within the predetermined period in the past, for example, within the past two months, is equal to or higher than the predetermined number of times). When the passing frequency is equal to or higher than the threshold value, the driving support control start routine according to the above modification is executed. On the other hand, when the passing frequency is lower than the threshold value, the driving support control start routine according to the first embodiment is executed. The threshold value of the passing frequency is not particularly limited and can be set as appropriate.

Other Embodiments

In the first embodiment and the second embodiment, a configuration is shown in which the driving support control is executed when a display object displaying the maximum speed is detected, but the display object is not limited to the display object indicating the maximum speed and may be other display objects. Other display objects include stop signs, entry prohibition signs, traveling direction regulation signs, traffic lights, railroad crossings, displays notifying traffic jams, and uphill warning signs. When the display object is a stop sign, an entry prohibition sign, a traveling direction regulation sign, a traffic light, a railroad crossing, and a display notifying a traffic jam, the operation of depressing the brake pedal (the operation of increasing the operation amount of the brake pedal) and the operation of reducing the operation amount of the accelerator pedal are applied to the conforming operation. Further, control of reducing the output of the engine 20 and control of operating the brake actuator 23 to apply a braking force to each wheel are applied to the conformity control in this case. When the display object is a warning sign indicating an uphill slope, an operation of increasing the operation amount of the accelerator pedal and an operation of downshifting are applied to the conforming operation. Control of increasing the output of the engine 20 and control of downshifting the transmission 22 are applied to the conformity control in this case.

As the driving support control start routine according to the other embodiments, a routine in which steps S102, S103, and S104 are omitted from the driving support control start routine in the first embodiment shown in FIG. 2 can be applied. In this case, when the CPU detects a specific display object in step S101, the CPU proceeds to step S107. In addition, as the driving support control start routine according to the other embodiments, a routine in which steps S202 and S203 are omitted from the driving support control start routine in the second embodiment shown in FIG. 3 can be applied. In this case, when the CPU detects a specific display object in step S201, the CPU proceeds to step S206.

Although the embodiments of the present disclosure has been described above, the present disclosure is not limited to the embodiments described above.

For example, in each of the above embodiments, a vehicle having an engine (internal combustion engine) as a driving force source is indicated, but the driving force source is not limited to the engine. The present disclosure can also be applied to a vehicle (electric vehicle) having a motor (electric motor) as a driving force source and a vehicle (hybrid vehicle) having an engine and a motor as driving force sources.

Further, in each of the above embodiments, a configuration has been described in which the support level of the driving support control has three support levels, namely the first level to the third level, but the number of the support levels of the driving support control is not limited to three. That is, the number of the support levels of the driving support control may be two or four or more.

What is claimed is:

1. A driving support device for a vehicle, the driving support device comprising:
   a front camera configured to acquire image data by capturing an image of a scene in front of the vehicle; and
   an electronic control unit (ECU) configured to execute driving support control for supporting driving by a driver of the vehicle when the ECU determines that a specific display object exists in front of the vehicle based on the acquired image data, the driving support control being executed depending on the specific display object, wherein the ECU is configured to determine a maximum speed indicated by the specific display object, determine an excess speed comprising an amount by which a speed of the vehicle exceeds the maximum speed, upon determination that the excess speed is less than a first predetermined threshold amount, execute a first level of driving support control comprising displaying content of the specific display object, upon determination that the excess speed is between the first predetermined threshold amount and a second predetermined threshold amount, execute a second level of driving support control comprising displaying the content of the specific display object and outputting a warning sound, and upon determination that the excess speed is greater than the second predetermined threshold amount, execute a third level of driving support control comprising displaying the content of the specific display object, outputting the warning sound, and decelerating the vehicle.

2. The driving support device according to claim 1, wherein the ECU is configured to:

detect a direction of a sight line of the driver;

determine, based on the direction of the sight line of the driver, whether the driver visually recognizes the specific display object that is determined to exist; and execute driving support control having a higher support level when the ECU determines that the driver is not visually recognizing the specific display object, as compared with a case where the ECU determines that the driver visually recognizes the specific display object.

3. The driving support device according to claim 2, wherein the controller ECU is configured to:

execute at least one of notification control and conformity control when the ECU determines that the driver is not visually recognizing the specific display object, the notification control causing the ECU to notify the driver that the specific display object is detected, and the conformity control being vehicle control for bringing a traveling state of the vehicle closer to a state conforming to display content of the specific display object; and execute the notification control when the ECU determines that the driver visually recognizes the specific display object.

4. The driving support device according to claim 1, wherein the ECU is configured to execute driving support control having a higher support level when a number of times it is determined that the specific display object exists in a predetermined past period of time is lower than a predetermined number of times compared with the number of times it is determined that the specific display object exists is equal to or higher than the predetermined number of times.

5. The driving support device according to claim 4, wherein the ECU is further configured to:

execute notification control and conformity control when the number of times determined that the specific display object exists is lower than the predetermined number of times and a conforming operation is not executed by the driver;

execute the notification control when the number of times determined that the specific display object exists is lower than the predetermined number of times and the conforming operation is executed by the driver;

wherein the notification control is an operation for notifying the driver that the specific display object is detected; and the conformity control is vehicle control for bringing the traveling state of the vehicle closer to a state conforming to display content of the specific display object.

6. A non-transitory storage medium storing instructions that are executable by one or more processors in a computer of a driving support device for a vehicle and that cause the one or more processors to perform steps comprising:

determining whether a specific display object exists in front of the vehicle based on image data acquired by capturing an image of a scene in front of the vehicle;

determining a maximum speed indicated by the specific display object;

determining an excess speed comprising an amount by which a speed of the vehicle exceeds the maximum speed;

upon determination that the excess speed is less than a first predetermined threshold amount, executing a first level of driving support control comprising displaying content of the specific display object;

upon determination that the excess speed is between the first predetermined threshold amount and a second predetermined threshold amount, executing a second level of driving support control comprising displaying the content of the specific display object and outputting a warning sound; and upon determination that the excess speed is greater than the second predetermined threshold amount, executing a third level of driving support control comprising displaying the content of the specific display object, outputting the warning sound, and decelerating the vehicle.

* * * * *